No. 819,281. PATENTED MAY 1, 1906.
T. HUGHES.
AXLE LUBRICATOR.
APPLICATION FILED JULY 6, 1905.
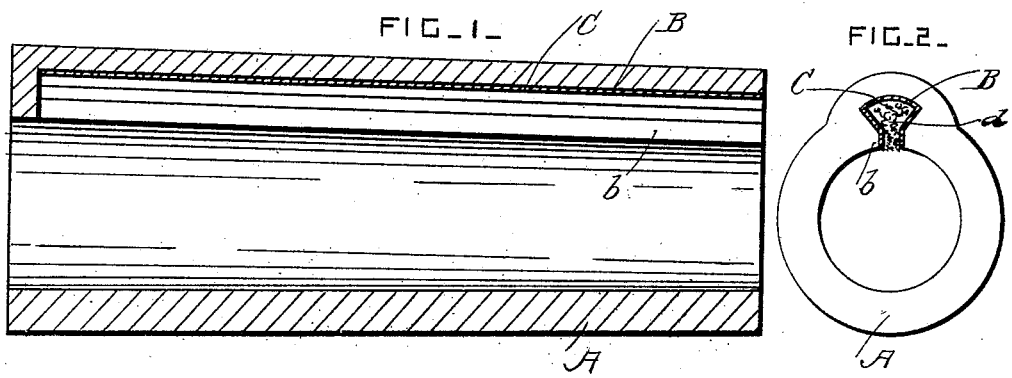

UNITED STATES PATENT OFFICE.

THOMAS HUGHES, OF EAST SOMERVILLE, MASSACHUSETTS.

AXLE-LUBRICATOR.

No. 819,281.        Specification of Letters Patent.        Patented May 1, 1906.

Application filed July 6, 1905. Serial No. 268,371.

*To all whom it may concern:*

Be it known that I, THOMAS HUGHES, a citizen of the United States, residing at East Somerville, in the county of Middlesex and State of Massachusetts, have invented certain new and useful Improvements in Axle-Lubricators; and I do hereby declare the following to be a full, clear, and exact description of the invention, such as will enable others skilled in the art to which it appertains to make and use the same.

This invention relates to devices for lubricating axles and other shafts and machine elements; and it consists in the novel construction and combination of parts hereinafter fully described and claimed.

In the drawings, Figure 1 is a longitudinal section through a lubricating-bush constructed according to this invention. Fig. 2 is an end view of the bush. Fig. 3 is a detail side view of the lubricating-trough. Fig. 4 is an end view of the trough.

A is a bush, or it may be the hub of any wheel or other similar machine element. This bush or hub is provided with a longitudinal chamber B on one side, which is open at one end. This chamber has a comparatively narrow opening $b$, where it communicates with the bearing-surface of the bush.

C is a small trough-shaped tube of thin sheet metal which is slidable longitudinally in the chamber B. The lubricating material $d$ is placed in this tube before the tube is slid into the chamber. Any approved lubricating material or grease may be used, and felt saturated with oil may be used.

The tube is withdrawn from time to time and the lubricating material inside it is renewed, so that the shaft or axle which runs in the bush is kept well supplied with lubricant.

What I claim is—

1. The combination, with a bearing member provided with a chamber at one side, of a tube for lubricating material which is slidable longitudinally in the said chamber.

2. The combination, with a bearing member provided with a chamber at one side having a narrow mouth, of a trough-shaped tube for lubricating material which is slidable longitudinally in the said chamber.

3. The combination, with a bearing member provided with a chamber at one side, of a thin sheet-metal tube for lubricating material having a restricted outlet and slidable longitudinally in the said chamber.

In testimony whereof I have affixed my signature in the presence of two witnesses.

THOMAS HUGHES.

Witnesses:
    ALICE J. MURRAY,
    FREDK. K. DAGGETT.